United States Patent
Suzuki (10) Patent No.: US 7,948,545 B2
(45) Date of Patent: May 24, 2011

(54) PHOTOELECTRIC CONVERSION LAYER STACK TYPE SOLID-STATE IMAGING DEVICE

(75) Inventor: Nobuo Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 340 days.

(21) Appl. No.: 11/758,701

(22) Filed: Jun. 6, 2007

(65) Prior Publication Data
US 2007/0285538 A1    Dec. 13, 2007

(30) Foreign Application Priority Data
Jun. 6, 2006 (JP) .................................. 2006-157149

(51) Int. Cl.
*H04N 5/335* (2011.01)
*H01L 27/146* (2006.01)
*H01L 31/00* (2006.01)

(52) U.S. Cl. ........ 348/308; 348/294; 257/444; 257/440

(58) Field of Classification Search .................. 348/272, 348/294, 308–310, 302; 250/208.1, 226; 257/431–466
See application file for complete search history.

(56) References Cited

U.S. PATENT DOCUMENTS

| | | | |
|---|---|---|---|
| 6,731,397 B1 * | 5/2004 | Merrill et al. | 358/1.16 |
| 6,930,336 B1 * | 8/2005 | Merrill | 257/292 |
| 7,129,446 B2 * | 10/2006 | Imaoka | 219/388 |
| 2003/0014369 A1 | 1/2003 | Okayama et al. | |
| 2003/0209651 A1 | 11/2003 | Iwasaki | |
| 2006/0208162 A1 * | 9/2006 | Inuiya | 250/208.1 |

FOREIGN PATENT DOCUMENTS

| | | |
|---|---|---|
| JP | 2002-502120 A | 1/2002 |
| JP | 2002-83946 A | 3/2002 |
| JP | 2002-513145 A | 5/2002 |
| JP | 2003-332551 A | 11/2003 |
| JP | 2004165242 A | 6/2004 |
| KR | 2003-067490 A | 8/2003 |
| WO | 99/39372 A2 | 8/1999 |
| WO | 99/56097 A1 | 11/1999 |

OTHER PUBLICATIONS

Office Action dated Aug. 18, 2010, issued by the Korean Intellectual Property Office in counterpart Korean Application No. 2007-55157.

* cited by examiner

*Primary Examiner* — Sinh Tran
*Assistant Examiner* — Mark Monk
(74) *Attorney, Agent, or Firm* — Sughrue Mion, PLLC (57) ABSTRACT

A solid-state imaging device as defined herein, in which each of the signal reading circuits for reading the detection signals of the first-color pixels includes three transistors which are a reset transistor, a row selection transistor, and an output transistor; and each of the signal reading circuits for reading the detection signals of the second-color pixels and each of the signal reading circuits for reading the detection signals of the third-color pixels include four transistors which are a read transistor, a reset transistor, a row selection transistor, and an output transistor.

15 Claims, 9 Drawing Sheets

PHOTOELECTRIC CONVERSION LAYER STACK TYPE SOLID-STATE IMAGING DEVICE

FIELD OF THE INVENTION

The present invention relates to a photoelectric conversion layer stack type solid state imaging device in which incident light of one of the three primary colors is detected by a photoelectric conversion layer laid above a semiconductor substrate and incident light of the other two colors that has passed through the photoelectric conversion layer is detected by photoelectric conversion elements (photodiodes) formed in the semiconductor substrate. In particular, the invention relates to a photoelectric conversion layer stack type solid-state imaging device capable of taking color images that are low in noise and hence is high in image quality.

BACKGROUND OF THE INVENTION

In single-plate color solid-state imaging devices as typified by CMOS image sensors, three or tour kinds of color filters are arranged in mosaic form on a large number of photoelectric conversion pixels that are arranged on a semiconductor substrate, With this structure, color signals corresponding to the color filters are output from the pixels, respectively, and a color image is generated by performing signal processing on those color signals.

However, color solid-state imaging devices in which color filters of the primary colors are arranged in mosaic form have a problem that they are low in efficiency of light utilization and sensitivity because ⅔ of incident light is absorbed by the color filters. The fact that each pixel produces a color signal of only one color raises a problem of low resolution. In particular, false colors appear noticeably.

To solve the above problems, imaging devices having a structure that photoelectric conversion layers are laminated in three layers on a semiconductor substrate on which signal reading circuits are formed are being studied and developed (refer to JP-T-2002-502120 (The symbol "JP-T" as used herein means a published Japanese translation of a PCT patent application.) (corresponding to WO 99/39372) and JP-A-2002-83946, for example). For example, these imaging devices have a pixel structure that photoelectric conversion layers which generate signal charges (electrons or holes) in response to blue (B) light, green (G) light, and red (R) light are laid in this order from the light incidence surface. Furthermore, these imaging devices are provided with signal reading circuits capable of independently reading, on a pixel-by-pixel basis, signal charges generated by the photoelectric conversion layers.

In the imaging devices having the above structure, almost all of incident light is photoelectrically converted into signal charges to be read and hence the efficiency of utilization of visible light is close to 100%. Furthermore, since respective pixels produce color signals of the three colors (R, G, and B), these imaging devices can generate good, high-resolution images (no false colors appear noticeably) with high sensitivity.

In the imaging device disclosed in JP-T-2002-513145 (corresponding to WO 99/56097), triple wells (photodiodes) for detecting optical signals are formed in a silicon substrate and signals having different spectra (i.e., having peaks at B (blue), G (green), and R (red) wavelengths in this order from the surface) are obtained so as to correspond to different depths in the silicon substrate. This utilizes the fact that the distance of entrance of incident light into the silicon substrate depends on the wavelength. Like the imaging devices disclosed in JP-T-2002-502120 (corresponding to WO 99/39372) and JP-A-2002-83946, this imaging device can produce good, high-resolution images (no false colors appear noticeably) with high sensitivity.

However, in the imaging devices disclosed in JP-T-2002-502120 (corresponding to WO 99/39372) and JP-A-2002-83946, it is necessary that the photoelectric conversion layers be formed in order in three layers on the semiconductor substrate and vertical interconnections be formed which transmit R, G, and B signal charges generated in the respective photoelectric conversion layers to the signal reading circuits formed on the semiconductor substrate. As such, these imaging devices have problems that they are difficult to manufacture and they are costly because of low production yields.

On the other hand, the imaging device disclosed in JP-T-2002-513145 corresponding to WO 99/56097) is configured in such a manner that blue light is detected by the shallowest photodiodes, red light is detected by the deepest photodiodes, and green light is detected by the intermediate photodiodes. However, the shallowest photodiodes, for example, also generate photo charges when receiving green or red light, as a result of which the spectra of R, G, an dB signals are not separated sufficiently from each other. Therefore, to obtain true R, G, and B signals, it is necessary to perform addition/subtraction processing on output signals of the photodiodes, which means a heavy computation load. Another problem is that the addition/subtraction processing lowers the S/N ratios of the image signals.

The imaging device disclosed in JP-A-2003-332551 has been proposed as one capable of solving the problems of the imaging devices of JP-T-2002-502120 (corresponding to WO 99/39372), JP-A-2002-83946 and JP-T-2002-513145 (corresponding to WO 99/56097). This imaging device is a hybrid type of the imaging devices of JP-T-2002-502120 (corresponding to WO 99/39372) and JP-A-2002-83946 and the imaging device of JP-T-2002513145 (corresponding to WO 99/56097) and is configured as follows. Only a photoelectric conversion layer (one layer) that is sensitive to green (G) light is laid on a semiconductor substrate and, as in the previous image sensors, incident light of blue (B) and red (R) that has passed through the photoelectric conversion layer is detected by two sets of photodiodes that are formed in the semiconductor substrate so as to be arranged in its depth direction.

Since it is sufficient to form only one photoelectric conversion layer, the manufacturing process is simplified and cost increase or reduction in yield can be avoided. Furthermore, since green light which is in an intermediate wavelength range is absorbed by the photoelectric conversion layer, the separation between the spectrum of signals generated by the photodiodes for blue light formed in the semiconductor substrate and that generated by the photodiodes for red light is improved, whereby the color reproduction performance is improved and the S/N ratios are increased.

SUMMARY OF THE INVENTION

Figure 11:
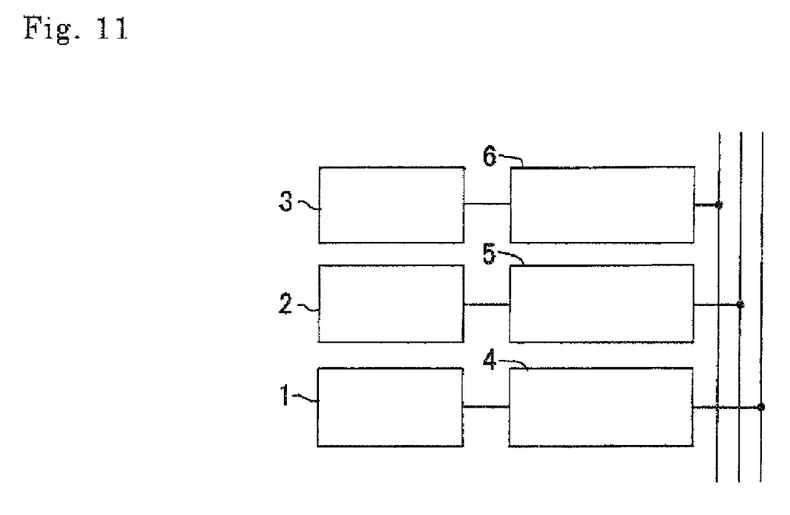
FIG. 11 shows a basic concept of a photoelectric conversion layer stack type solid-state imaging device.

In the hybrid color solid-state imaging device in which the blue-detecting photodiodes (photoelectric conversion elements; hereinafter referred to as B pixels) and red-detecting photodiodes (photoelectric conversion elements; hereinafter referred to as R pixels) are arranged in the depth direction of the semiconductor substrate and the green-detecting photoelectric conversion layer (hereinafter referred to as G pixels) is laid above the surface of the semiconductor substrate, each of the large number of unit pixels arranged like a two-dimensional array has an R pixel 1, a B pixel 2, and a G pixel 3 as shown in FIG. 11 Therefore, three signal reading circuits 4-6 (4, 5, 6) for reading signals of the respective colors and outputting those to the outside need to be formed for each unit pixel.

Figure 12A:
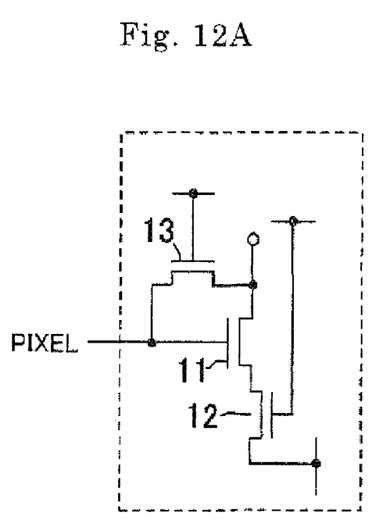
FIG. 12A is a circuit diagram of a signal reading circuit having a 3-transistor structure.
Figure 12B:
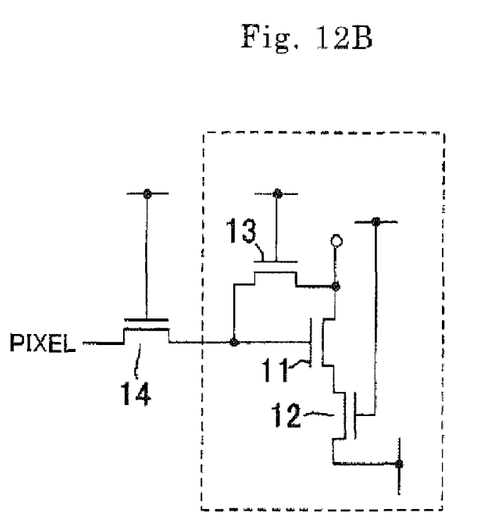
FIG. 12B is a circuit diagram of a signal reading circuit having a 4-transistor structure.

The known signal reading circuits used in conventional CMOS image sensors can be used as they are as the above signal reading circuits 4-6. Each of these signal reading circuits 4-6 is composed of transistors and classified into two types. FIG. 12A shows a signal reading circuit (hereinafter referred to as "3-transistor type") which is composed of three transistors (i.e., an output transistor 11, a row selection transistor 12, and a reset transistor 13). FIG. 12B shows a signal reading circuit (hereinafter referred to as "4-transistor type") which is composed of four transistors (i.e., an output transistor 11, a row selection transistor 12, a reset transistor 13, and a read transistor 14).

The 3-transistor-type signal reading circuit requires nine transistors per unit pixel and the 4-transistor-type signal reading circuit requires 12 transistors per unit pixel. Since the transistors are formed on a semiconductor substrate, if the number of transistors is large, the photo detecting areas of the B pixels and the R pixels on the same semiconductor substrate are made small. As a result, the sensitivity and the saturation output voltage are lowered, resulting in reduction in image quality. Therefore, the 3-transistor-type signal reading circuit is advantageous in terms of area. On the other hand, the 4-transistor-type signal reading circuit is advantageous in that random noise can be reduced by double sampling processing.

However, where each of the signal reading circuits of the hybrid color solid-state imaging device is given a 4-transistor-type signal reading circuit, there is a probability that complete color signals cannot be read-out which correspond to signal charges generated in the photoelectric conversion layer. Such a phenomenon causes afterimages and thereby lowers the image quality of images taken.

On the other hand, the employment of the 3-transistor structure which is advantageous in terms of area is associated with a problem that reset noise including random noise (mainly kTC noise) is high and the image quality of object images is lowered.

An object of the present invention is to provide a hybrid photoelectric conversion layer stack type solid-state imaging device capable of taking color images having high image quality.

Another object of the invention is to provide a hybrid photoelectric conversion layer stack type solid-state imaging device capable of lowering random noise without causing after images.

A further object of the invention is to provide a hybrid photoelectric conversion layer stack type solid-state imaging device in which the photodetecting areas of pixels formed on a semiconductor substrate can be increased by decreasing the number of transistors.

The invention provides a photoelectric conversion layer stack type solid-state imaging device including a semiconductor substrate and plural unit pixels arranged like a two-dimensional array, in which each of the unit pixels consists of a first-color pixel, a second-color pixel, and a third-color pixel for detecting incident light quantities of a first color, a second color, and a third color of three primary colors, respectively, the first-color pixels are formed in a photoelectric conversion layer which is provided above the semiconductor substrate, the second-color pixels and the third-color pixels are formed by respective photodiodes which are provided in the semiconductor substrate, and detection signals of the first-color pixels, the second-color pixels, and the third-color pixels are read-out by sets of signal reading circuits which are provided in the semiconductor substrate for the respective unit pixels, characterized in that each of the signal reading circuits for reading the detection signals of the first-color pixels is composed of three transistors which are a reset transistor, a row selection transistor, and an output transistor; and that each of the signal reading circuits for reading the detection signals of the second-color pixels and each of the signal reading circuits for reading the detection signals of the third-color pixels are composed of four transistors which are a read transistor, a reset transistor, a row selection transistor, and an output transistor.

The photoelectric conversion layer stack type solid-state imaging device according to the invention is characterized in that among the transistors constituting each of the signal reading circuits for reading the detection signals of the second-color pixels, three transistors other than the read transistor also serve as three transistors other than the read transistor among the transistors constituting the associated one of the signal reading circuits for reading the detection signals of the third-color pixels, and the two read transistors are turned on/off with different timings.

The photoelectric conversion layer stack type solid-state imaging device according to the invention is characterized in that a first signal processing section for performing signal processing on output signals of the signal reading circuits for reading the detection signals of the first-color pixels and for outputting a resulting output signal and a second signal processing section for performing signal processing on output signals of the signal reading circuits for reading the detection signals of the second-color pixels and the third-color pixels and for outputting resulting output signals are provided in the semiconductor substrate.

The photoelectric conversion layer stack type solid-state imaging device according to the invention is characterized in that a combining section for combining the output signal of the first signal processing section with the output signals of the second signal processing section and for outputting a composed signal to outside the imaging device is provided in the semiconductor substrate.

The photoelectric conversion layer stack type solid-state imaging device according to the invention is characterized in that a signal processing section for switching between output signals of signal reading circuits for reading detection signals of first-color pixels and output signals of signal reading circuits for reading detection signals of second or third pixels, performing signal processing on the output signals that are taken in by the switching, and outputting resulting output signals is provided in the semiconductor substrate.

The photoelectric conversion layer stack type solid-state imaging device according to the invention is characterized in that sample-and-hold circuits are provided at an input stage of the signal processing circuit which takes in the output signals of the signal reading circuits for reading the detection signals of the first-color pixels, and correlation double sampling circuits are provided at an input stage of the signal processing section which takes in the output signals of the signal reading circuits for reading the detection signals of the second-color pixels and the third-color pixels.

The photoelectric conversion layer stack type solid-state imaging device according to the invention is characterized in that each of the sample-and-hold circuits is composed of a correlation double sampling circuit consisting of a clamp circuit for clamping an input signal and a sample-and-hold circuit for sampling and holding an output signal of the clamp circuit, and a bypass circuit for the clamp circuit.

The photoelectric conversion layer stack type solid-state imaging device according to the invention is characterized in that after the detection signals of the first-color pixels are read-out by the signal reading circuits and taken in by the signal processing circuit, reset noise signals are read-out by the signal reading circuits and taken in by the signal processing circuit before next detection signals of the first-color pixels are read-out.

The photoelectric conversion layer stack type solid-state imaging device according to the invention is characterized in that the row selection transistor of each of the 4-transistor signal reading circuits is omitted and instead a voltage applied to a drain terminal of the reset transistor is controlled variably.

The photoelectric conversion layer stack type solid-state imaging device according to the invention is characterized in that the photoelectric conversion layer has a structure that a single-layer or multilayer organic semiconductor layer is sandwiched between a transparent pixel electrode layer and a transparent counter electrode layer.

The photoelectric conversion layer stack type solid-state imaging device according to the invention is characterized in that the set of photodiodes of the second-color pixels and the set of photodiodes of the third-color pixels are separated from each other in a depth direction of the semiconductor substrate.

The photoelectric conversion layer stack type solid-state imaging device according to the invention is characterized in that the first-color pixels, the second-color pixels, and the third-color pixels detect incident light quantities as amounts of electrons.

The photoelectric conversion layer stack type solid-state imaging device according to the invention is characterized in that the first color pixels detect incident light quantities as amounts of holes, and the second-color pixels and the third-color pixels detect incident light quantities as amounts of electrons.

The photoelectric conversion layer stack type solid-state imaging device according to the invention is characterized in that the output signals of the signal processing sections are analog signals.

The photoelectric conversion layer stack type solid-state imaging device according to the invention is characterized in that the output signals of the signal processing sections are digital signals.

The photoelectric conversion layer stack type solid-state imaging device according to the invention is characterized in that the first color, the second color, and the third color are green, blue, and red, respectively.

The invention makes it possible to provide a hybrid photoelectric conversion layer stack type solid-state imaging device capable of taking color images that are low in the degree of afterimages and hence high in image quality.

DESCRIPTION OF SYMBOLS

11: Output transistor
12: Row selection transistor
13: Reset transistor
14, 14R, 14B: Read transistor
20: Photoelectric conversion layer stack type solid-state imaging device
21: Semiconductor substrate
22: Unit pixel
23, 24: Output signal processing section
25: Column-direction scanning control section
26: R-pixel/B-pixel column signal line
27: -pixel column signal line
28, 29: Read signal line
30: Reset signal line
31: Row selection signal line
36: N-type region of photodiode for red light detection
37: N-type region of photodiode for blue light detection
43: Photoelectric conversion layer for green light detection
48, 49: Terminal
50: G-pixel signal reading circuit
51: R-pixel/B-pixel signal reading circuit
54: Correlation double sampling circuit
57: Clamp circuit
58: Sample-and-hold circuit
62: Switch circuit for column signal line switching
63: Switch circuit for bypassing of clamp circuit

DETAILED DESCRIPTION OF THE INVENTION

An embodiment of the present invention will be hereinafter described with reference to the drawings.

Embodiment 1

Figure 1:
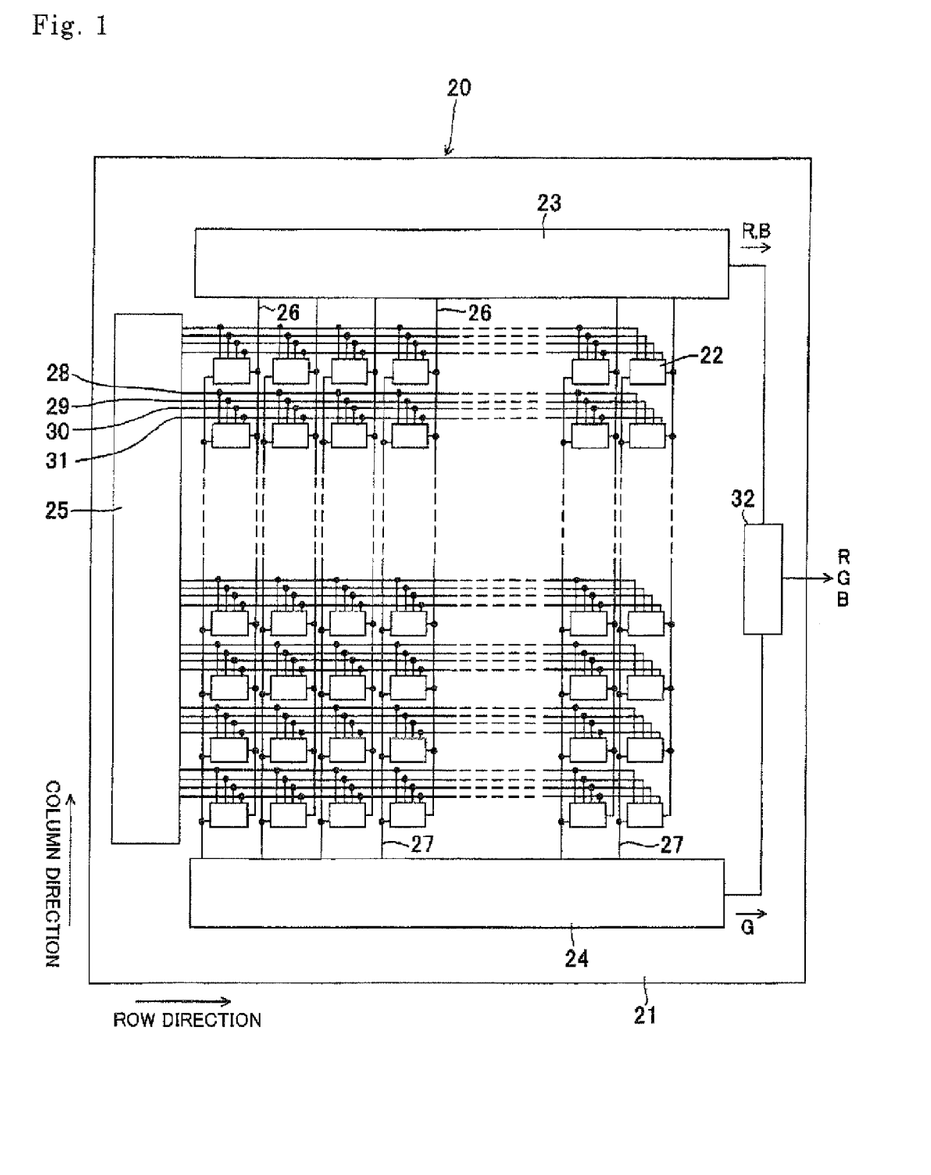
FIG. 1 schematically shows the surface of a photoelectric conversion layer stack type solid-state imaging device according to a first embodiment of the present invention.

FIG. 1 schematically shows the surface of a photoelectric conversion layer stack type color solid-state imaging device according to a first embodiment of the invention. In the photoelectric conversion layer stack type color solid-state imaging device 20, plural unit pixels 22 are arranged in square lattice form. Output signal processing sections 23 and 24 each including a row-direction scanning reading section are disposed adjacent to the top and bottom sidelines of the semiconductor substrate 21, respectively. A column-direction scanning control section 25 is disposed adjacent to the left sideline of the semiconductor substrate 21. In this embodiment, the output signal processing section 23 is in charge of red (R) signals and blue (3) signals and the output signal processing section 24 is in charge of green (G) signals.

The unit pixels 22 are connected to the output signal processing section 23 via column signal lines 26 and connected to the output signal processing section 24 via columns signal lines 27. The unit pixels 22 are connected to the column-direction scanning control section 25 via four sets of signal lines 28-31. The signal lines 28 and 29 are read signal lines, the signal line 30 is a reset signal line, and the signal line 31 is a row selection signal line.

A combining section 32, which is disposed adjacent to the right sideline of the semiconductor substrate 21, combines outputs of the two output signal processing sections 23 and 24 and outputs a combined signal to the outside.

Figure 2:
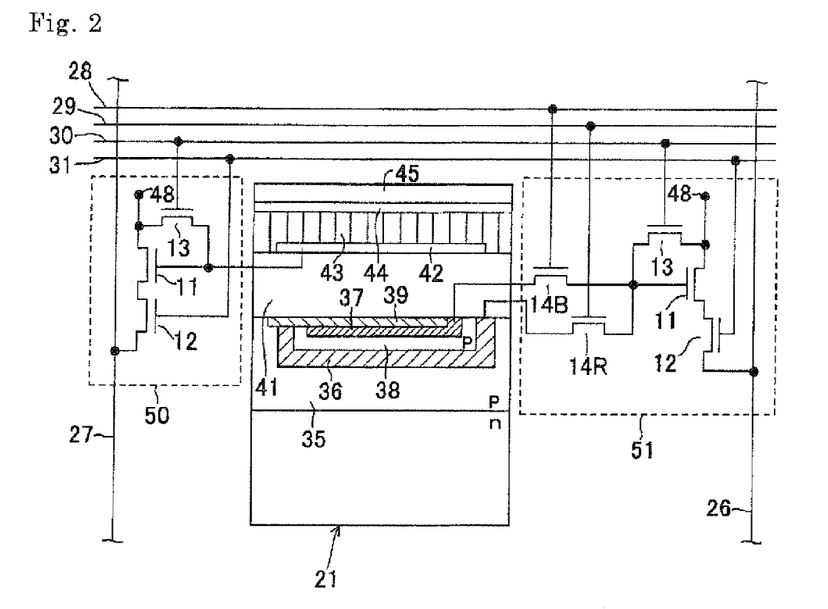
FIG. 2 is a schematic sectional view of one unit pixel and circuit diagrams of signal reading circuits of the photoelectric conversion layer stack type solid-state imaging device of FIG. 1.

FIG. 2 is a conceptual diagram of each unit pixel shown in FIG. 1. A p-well layer 35 is formed adjacent to the surface of an n-type semiconductor substrate 21 and n-type regions 36 and 37 are formed in the p-well layer 35 at a deep position and a shallow position, respectively. The n-type regions 36 and 37 are separated from each other with a p-type region 38 interposed in between, and a p-type high-concentration impurity surface layer 39 for dark current suppression is formed on the surface side of the n-type region 37.

Pn junctions (i.e., photodiodes) are formed between the deep n-type region 36 and the p-type region 38 (located above the n-type region 36) and between the n-type region 36 and the well layer 35 (located below the n-type region 36). Signal charge (in this example, charge of electrons) corresponding to long-wavelength light (mainly red light) that enters deeply is stored in the n-type region 36. That is, these photodiodes constitute an R pixel.

Pn junctions (i.e., photodiodes) are formed between the shallow n-type region 37 and the p-type high-concentration impurity surface layer 39 (located above the n-type region 37) and between the n-type region 37 and the p-type region 38 (located below the n-type region 37). Signal charge (in this example, charge of electrons) corresponding to short-wavelength light (mainly blue light) that is absorbed in a shallow portion and cannot enter deeply is stored in the n-type region 37. That is, these photodiodes constitute a B pixel.

A transparent insulating film 41 is laid on the surface of the semiconductor substrate 21. A transparent pixel electrode layer 42 is laid on the insulating film 41 and sectioned so as to correspond to the respective unit pixels. A photoelectric conversion layer 43 which is sensitive to intermediate-wavelength light (mainly green light) is laid on the pixel electrode layer 42. A transparent counter electrode layer 44 is laid on the photoelectric conversion layer 43 so as to be common to the unit pixels. A transparent protective film (insulating film) 45 is laid as a top film.

The transparent electrode layers 42 and 44 are made of a material that is low in light absorption and may be thin metal thin-films or metal compound thin-films of ITO, for example.

The counter electrode layer 44 may be either a single film that is common to the unit pixels or sectioned into plural parts that correspond to the respective unit pixels, unit pixel columns, or unit pixel rows. In the latter case, wiring is made so that a single common potential can be applied to the entire counter electrode layer 44.

The photoelectric conversion layer 43 may be either a single-layer or multilayer film and is made of an organic semiconductor that is sensitive to green light, an organic material containing an organic dye that is sensitive to green light, or a like material. The photoelectric conversion layer 43 generates photocharge (electron-hole pairs) corresponding to the light quantity of received green light and thus constitutes a G pixel.

The photoelectric conversion layer stack type color solid-state imaging device according to the embodiment is configured in such a manner that a signal corresponding to signal charge (in this example, charge of electrons) detected by the G pixel is read-out by a signal reading circuit 50 having the 3-transistor structure and signals corresponding to signal charges (in this example, charges of electrons) detected by the R pixel and B pixel are read-out by a signal reading circuit 51 having the 4-transistor structure.

Furthermore, in this embodiment, to decrease the number of transistors, the R-pixel signal reading circuit and the B-pixel signal reading circuit have a common portion, so that the signal reading circuit 51 for the one unit pixel has five transistors. Therefore, the signal reading circuits 50 and 51 for the one unit pixel have eight transistors in total. However, if there is a sufficient area, the R-pixel signal reading circuit and the B-pixel signal reading circuit may be separated from each other completely.

Although in FIG. 2 the signal reading circuits 50 and 51 are expressed as circuit diagrams, the MOS transistors constituting the signal reading circuits 50 and 51 are formed on the p-well layer 35 of the semiconductor substrate 21. Although omitted in FIG. 2, G signal charge flowing out of the pixel electrode layer 42 is stored in a charge storage region which is an impurity region formed on the semiconductor substrate 21. The stored charge is read cut by the signal reading circuit 50 having the 3-transistor structure. The charge storage region and the signal reading circuits 50 and 51 are formed in portions that are covered with a light shield film.

The C-pixel signal reading circuit 50 is the same as the circuit of FIG. 12B and has an output transistor 11, a row selection transistor 12, and a reset transistor 13.

A series connection of the output transistor 11 and the row selection transistor 12 is connected between a DC power terminal 48 and the column signal line 27. The gate of the output transistor 11 is connected to the pixel electrode layer 44 via the above-mentioned charge storage region of the G pixel, and the gate of the row selection transistor 12 is connected to the row selection signal line 31. The reset transistor 13 is provided between the DC power terminal 48 and the gate of the output transistor 11, and the gate of the reset transistor 13 is connected to the reset signal line 30.

The 3-transistor portion (i.e., output transistor 11, row selection transistor 12, and reset transistor 13) of the signal reading circuit 51 is the same as the signal reading circuit 50. A series connection of the output transistor 11 and the row selection transistor 12 is connected between a DC power terminal 48 and the column signal line 26. The gate of the row selection transistor 12 is connected to the row selection signal line 31. The reset transistor 13 is provided between the DC power terminal 48 and the gate of the output transistor 11, and the gate of the reset transistor 13 is connected to the reset signal line 30.

A read transistor 14R as a switching means for connecting or disconnecting the gate of the output transistor 11 to or from the R pixel (n-type region 36) is connected between them, and the gate of the read transistor 14R is connected to the read signal line 29. That is, the transistors 14R, 11, 12, and 13 constitute an R-pixel signal reading circuit having the 4-transistor structure.

A read transistor 14B as a switching means for connecting or disconnecting the gate of the output transistor 11 to or from the B pixel (n-type region 37) is connected between them, and the gate of the read transistor 14B is connected to the read signal line 28. That is, the transistors 143, 11, 12, and 13 constitute a B-pixel signal reading circuit having the 4-transistor structure.

Figure 3:
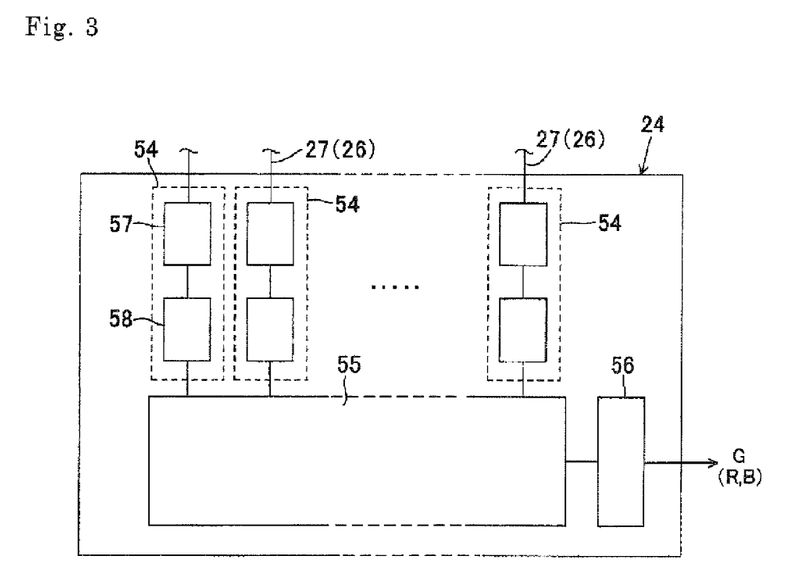
FIG. 3 shows a detailed configuration of an output signal processing section shown in FIG. 1.

FIG. 3 shows the configuration of the output signal processing section 24. The output signal processing section 23 has the same configuration as the output signal processing section 24. The output signal processing section 24 is equipped with correlation double sampling circuits 54 which are connected to the respective column signal lines 27 (in the case of the output signal processing section 23, the respective column signal lines 26) so as to correspond to the respective column signal lines 27, a row-direction scanning reading section 55 which is connected to the correlation double sampling circuits 54, and an output section 56 which is disposed at the output end of the row-direction scanning reading section 55 and outputs an image signal to the combining section 32 shown in FIG. 1.

Each correlation double sampling circuit 54 is equipped with a clamp circuit 57 for clamping a signal on the column signal line 27 and a sample-and-hold circuit 58 for holding an output of the clamp circuit 57.

When light coming from an object shines on the photoelectric conversion layer stack type color solid-state imaging device having the above configuration, green light of the incident light is absorbed by the photoelectric conversion layer 43 and signal charges are generated in the photoelectric conversion layer 43 (electron-hole pairs are generated in the photoelectric conversion layer 43; in this embodiment, the signal charges are charges of electrons). Necessary electric fields are formed in the photoelectric conversion layer 43 by applying a voltage between the pixel electrode layer 42 and the common electrode layer 44, whereby the signal charges move quickly to the pixel electrode layer 42 along the electric field lines and then move to and stored in the above-mentioned charge storage regions. The signal charges also flow to the gates of the output transistors 11 of the signal reading circuits 50 and are stored there.

Mixed light of red light and blue light that has passed through the photoelectric conversion layer 43 shines on the semiconductor substrate 21. The blue light of the mixed light is mainly absorbed by a shallow portion, near the surface, of the semiconductor substrate 21 and generated signal charges (electrons) are stored in the n-type regions 37.

The red light of the mixed light enters into a deep portion of the semiconductor substrate 21 and is absorbed there, and generated charges (electrons) are stored in the n-type regions 36.

The column-direction scanning control section 25 shown in FIG. 1 outputs a row selection signal for selection of a unit pixel row to a signal line 31, whereby the row selection transistors 12 of the signal reading circuits 50 and 51 of the selected unit pixel row are turned on (i.e., rendered conductive). The signal reading circuits 50 and 51 thereafter perform signal reading in parallel.

In each G-pixel signal reading circuit 50, the signal charge is supplied from the G pixel to the gate of the output transistor 11 and the output transistor 11 produces a voltage signal corresponding to the amount of the signal charge. When the row selection transistor 12 is turned on, the voltage signal is output to the column signal line 27 as a G image signal. Reset noise of the immediately preceding frame is superimposed on the G image signal.

Then, the column-direction scanning control section 25 outputs a reset signal to the reset signal line 30, whereupon a reset noise signal is output to the column signal line 27. Since the reset transistor 13 is rendered conductive, the G signal charge being applied to the gate of the output transistor 11 is discarded to the DC power source side via the reset transistor 13 and a standby state for shooting of an image of the next frame is established.

Each correlation double sampling circuit 54 of the output signal processing section 24 performs signal processing including subtraction of the reset noise signal from the G image signal (correlation double sampling). Under the control of the row-direction scanning reading section 55, the G image signals produced by the G pixels of the unit pixel row concerned are output to the combining section 32 shown in FIG. 1. The subtraction processing (correlation double sampling) of each correlation double sampling circuit 54 reduces fixed pattern noise such as an offset voltage variation of the signal reading circuit 50.

However, in this embodiment, a one-frame time deviation exists between random noise (reset noise) contained in the G image signal and random noise contained in the reset noise signal. Therefore, the random noise cannot be reduced by the subtraction processing (correlation double sampling). An embodiment (third embodiment) for reducing such random noise will be described later.

In each signal reading circuit 51, an R image signal is read-out after a B image signal. Conversely, a B image signal may be read-out after an R image signal.

First, a row selection signal is output from the column-direction scanning control section 25 to a signal line 31, whereby the corresponding row selection transistors 12 are rendered conductive. Then, a reset signal is output from the column-direction scanning control section 25 to the reset signal line 30, whereby the corresponding reset transistors 13 are rendered conductive. At this time, reset noise signals are output to the column signal lines 26. Residual charges being applied to the gates of the output transistors 11 are discarded to the DC power source side via the reset transistors 13.

When a read signal is output from the column-direction scanning control section 25 to the signal line 28, the read transistors 14B are turned on (i.e., rendered conductive). At this time, since no read signal is output to the signal line 29, the read transistors 14R are kept off (i.e., kept in a cut-off state).

When a read transistor 14S is turned on, the n-type region 37 is connected to the gate of the output transistor 11, whereby the output transistor 11 produces a voltage signal corresponding to the amount of charge stored in the n-type region 37. The voltage signal produced by the output transistor 11 is output to the column signal line 26 as a B image signal. Reset noise of the immediately preceding frame is superimposed on the B image signal.

Each correlation double sampling circuit 54 of the output signal processing section 23 takes in the reset noise signal and the reset-noise-signal-superimposed B image signal which are output to the column signal line 26 and performs signal processing including subtraction (correlation double sampling). The subtraction processing (correlation double sampling) of the correlation double sampling circuit 54 reduces fixed pattern noise and random noise.

Under the control of the row-direction scanning reading section 55 of the output signal processing section 23, the B image signals produced by the B pixels of the unit pixel row concerned are output to the combining section 32 shown in FIG. 1.

Then, the column-direction scanning control section 25 outputs a reset signal, whereupon the charge being applied to the gate of the output transistor 11 is discarded to the DC power source side via the reset transistor 13 and a reset noise signal is output to the column signal line 26. Then, an off signal and an on signal are output to the reading signal lines 28 and 29, respectively, whereby the read transistor 14B is turned off and the read transistor 14R is turned on. As a result, an R image signal on which the reset noise signal is superimposed is output to the column signal line 26.

In each output signal processing section 23, correlation double sampling is performed in the same manner as described above, whereby fixed pattern noise and random noise are reduced. Under the control of the row-direction scanning reading section 55, the R image signals produced by the R pixels of the unit pixel row concerned are output to the combining section 32 shown in FIG. 1.

The combining section 32 combines the R, G, and B image signals that are taken in from the output signal processing sections 23 and 24 and outputs a resulting composed signal to the external circuit. The above operation is performed every time the unit pixel row as a subject of reading is switched, whereby a color image signal of one picture is output.

According to this embodiment, since the signal reading circuits 50 of the pixels (G pixels) formed in the photoelectric conversion layer 43 have the 3-transistor structure, the amounts of charges remaining in the photoelectric conversion layer 43, the pixel electrode layer 42, the charge storage regions (not shown), etc. are smaller than in the case where the 4-transistor structure is employed. As a result, the degree of an afterimage of a G image is lowered and hence the degree of image quality deterioration is reduced.

Furthermore, according to this embodiment, since the reading of signal charges from the pixels (R pixels and B pixels) formed by the photo diodes which are formed in the semiconductor substrate 21 is performed by the signal reading circuits 51 having the 4-transistor structure, noise can be made smaller than in the case where the 3-transistor structure is employed. As a result, R and B images are increased in image quality.

What is more, according to this embodiment, since the signal reading circuits for reading signals by reading signal charges from R and B pixels are partly commonized, the number of necessary transistors is decreased and each correlation double sampling circuit of the output signal processing section 23 can be shared by the R and B pixels, which makes it possible to reduce the chip size of the color solid-state imaging device 20.

Since the correlation double sampling circuits 54 are analog circuits and each of them is composed of a large-capacitance capacitance element (capacitor), an amplifier, etc., they occupy a large area in the semiconductor chip. The sharing of the analog circuits is effective in reducing the area used. Furthermore, according to this embodiment, since the number of necessary transistors is decreased, the photodetecting areas of the R-pixel and B-pixel photodiodes can be increased and their sensitivity can be increased. In addition, the reduction in saturation output voltage can be suppressed.

Embodiment 2

Figure 4:
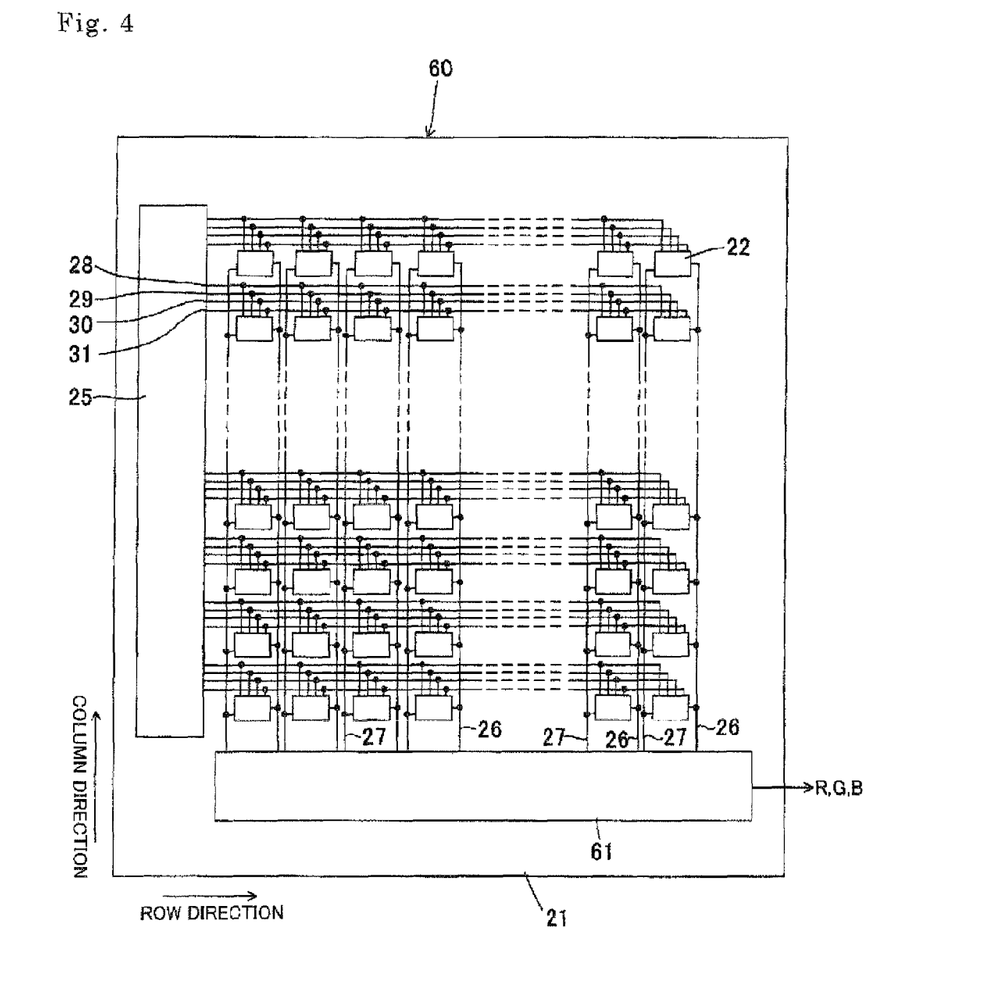
FIG. 4 schematically shows the surface of a photoelectric conversion layer stack type solid-state imaging device according to a second embodiment of the invention.

FIG. 4 schematically shows the surface of a photoelectric conversion layer stack type color solid-state imaging device 60 according to a second embodiment of the invention. The same components as in the first embodiment will be given the same symbols as in the first embodiment and will not be described.

This embodiment is characterized in that the two output signal processing sections 23 and 24 of the first embodiment shown in FIG. 1 are communized into a single output signal processing circuit 61. The sectional structure of each unit pixel 22 and the circuit configurations of the signal reading circuits 50 and 51 are the same as in the first embodiment (see FIG. 2). Each unit pixel 22 is connected to the output signal processing circuit 61 via column signal lines 26 and 27.

Figure 5:
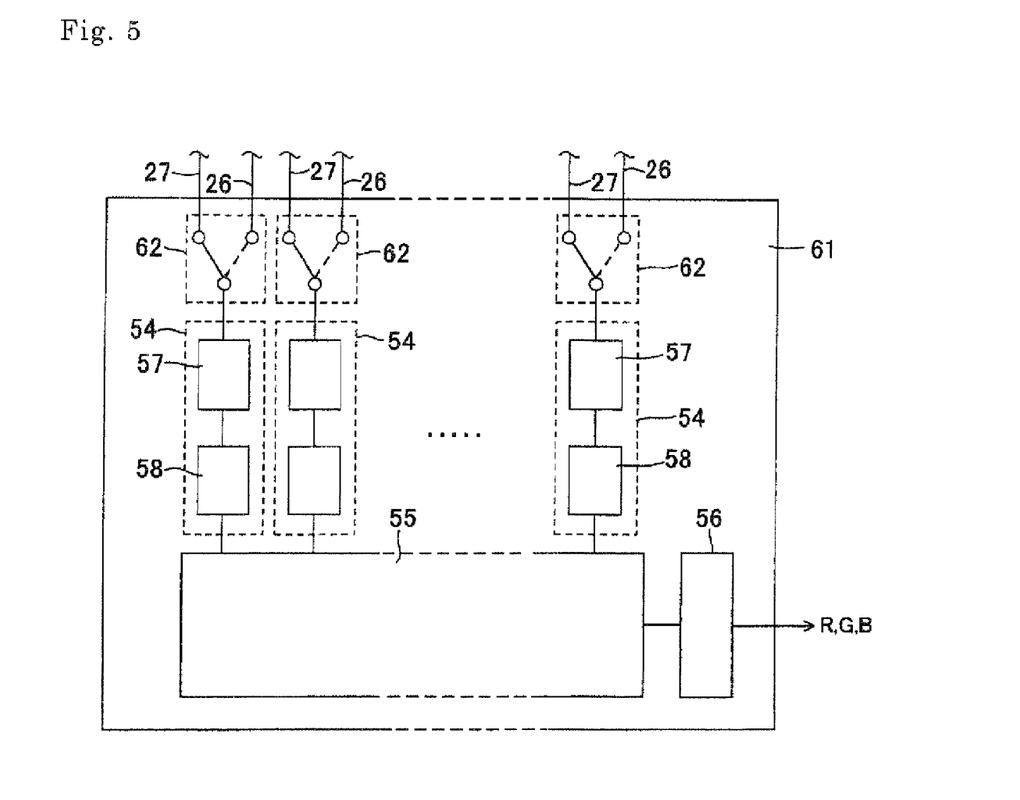
FIG. 5 shows a detailed configuration of an output signal processing section of the photoelectric conversion layer stack type solid-state imaging device of FIG. 4.

FIG. 5 shows the configuration of the output signal processing circuit 61 according to this embodiment. In this embodiment, to connect, to each single correlation double sampling circuit 54, the two column signal lines 26 and 27 which are connected to each unit pixel 22, a switch circuit 62 is provided which switches to selected one of the column signal lines 26 and 27 and thereby connects it to the correlation double sampling circuit 54.

In the photoelectric conversion layer stack type color solid-state imaging device according to this embodiment, color image signals are read-out in the following order, for example. First, the row selection transistors 12 of a unit pixel row as a subject of reading are rendered conductive and the switch circuits 62 selects the column signal lines 27 (G signal side). As a result, C signals (image signals) corresponding to signal charges of the G pixels are supplied to the column signal lines 27 and taken in by the output signal processing section 61.

Then, a reset signal is applied to the reset signal line 30, whereupon reset noise signals of the G pixels are output to the column signal lines 27 and taken in by the output signal processing section 61. In the output signal processing section 61, each correlation double sampling circuit 54 performs signal processing including subtraction (correlation double sampling) of the reset noise signal from the image signal. Output signals corresponding to the G signals are thus output sequentially.

As in the first embodiment, the subtraction processing (correlation double sampling) of each correlation double sampling circuit 54 cannot lower random noise though it can lower fixed pattern noise.

Then, the switch circuits 62 are switched so as to connect the column signal lines 26 to the output signal processing section 61. When a reset signal is applied to the reset signal line 30, reset noise signals of the B pixels are output to the column signal lines 26. When a read signal is applied to the B pixels, B signals (image signals) corresponding to signal charges of the B pixels are output to the column signal lines 26.

In the output signal processing section 61, each correlation double sampling circuit 54 performs signal processing including subtraction (correlation double sampling) of the reset noise signal from the image signal. Output signals corresponding to the B signals are thus output sequentially. The subtraction processing (correlation double sampling) of each correlation double sampling circuit 54 can lower fixed pattern noise and random noise. Output signals corresponding to the R signals are output sequentially by performing the same operation on the R pixels as the operation that was performed on the B pixels.

Similar operations are performed repeatedly while the unit pixel row as a subject of processing is switched, whereby signals of the R, G, and B pixels of all the unit pixels are read-out. Naturally, the order of reading of R signals and B signals may be reversed.

In the photoelectric conversion layer stack type color solid-state imaging device 60 according to this embodiment, since the output signal processing sections 23 and 24 of the first embodiment which require large areas are commonized into the single output signal processing section 61, the chip area can be made even smaller and the cost of the imaging device can be made lower than in the first embodiment.

Embodiment 3

Figure 6:
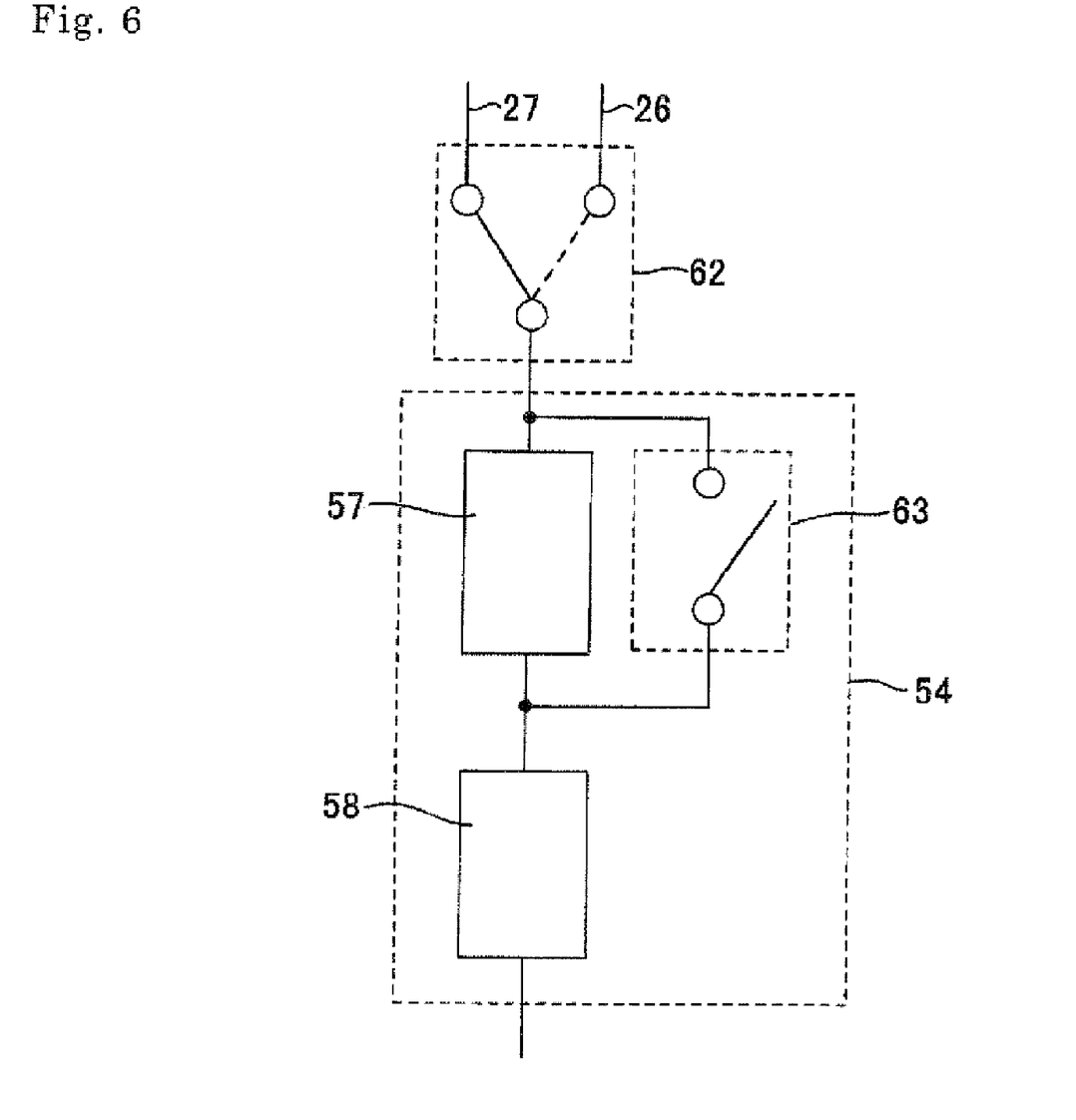
FIG. 6 shows the configuration of each analog circuit unit which is provided in an output signal processing section of a photoelectric conversion layer stack type solid-state imaging device according to a third embodiment of the invention.

FIG. 6 shows the configuration of an important part of an output signal processing section of a photoelectric conversion layer stack type color solid-state imaging device according to a third embodiment of the invention The entire configuration, the sectional structure, etc. of the photoelectric conversion layer stack type color solid-state imaging device according to this embodiment are the same as those of the imaging device according to the second embodiment (see FIGS. 4 and 2) and hence will not be described in detail.

Each analog circuit unit of the output signal processing section of this embodiment is composed of the switch circuit 62 that was described above with reference to FIG. 5 and a sampling circuit 54 which is composed of a clamp circuit 57 and a sample-and-hold circuit 58. And each analog circuit unit is characterized in that a switch circuit 63 is provided in a bypass route of the clamp circuit 57 and makes effective or breaks the bypass route.

When the clamp circuit 57 is rendered effective by opening the switch circuit 63, the sampling circuit 54 performs correlation double sampling. When the clamp circuit 57 is rendered ineffective by closing the switch circuit 63, the sampling circuit 54 performs only sample-and-hold processing.

In the photoelectric conversion layer stack type color solid-state imaging device according to this embodiment, color image signals are read-out in the following order, for example. First, the row selection transistors 12 of a unit pixel row as a subject of reading are rendered conductive and each switch circuit 62 selects the column signal line 27 (G signal side). Furthermore, the switch circuit 63 is closed to bypass the clamp circuits 57. That is, the clamp circuit 57 is rendered ineffective.

A green signal (image signal) corresponding to signal charge of the G pixel is supplied to the column signal line 27 and input to the sampling circuit 54. As described above, reset noise of the immediately preceding frame is superimposed on the G image signal.

The sampling circuit 54 performs sample-and-hold processing without performing clamping and outputs an image signal corresponding to the G signal which contains the reset noise to the row-direction scanning reading section (not shown).

Then, the switch circuit 62 is switched so as to connect the column signal line 26 to the sampling circuit 54. Furthermore, the switch circuit 63 is opened to render the clamp circuit 57 effective.

When a reset signal is applied to the reset signal line 30, reset noise signal of the B pixel is output to the sampling circuit 54 via the column signal line 26. When a read signal is applied to the B pixel, a B signal (image signal) corresponding to signal charge of the B pixel is output and it is input to the sampling circuit 54.

The sampling circuit 54 subtracts the reset noise signal from the image signal containing the reset noise signal, and outputs the B signal from which the reset noise signal is removed. An R signal is output by performing the same operation on the R pixel as the operation that was performed on the B pixel Then, the switch circuit 62 is switched so as to connect the G-signal column signal line 27 to the sampling circuit 54. Furthermore, the switch circuit 63 is closed to bypass the clamp circuit 57.

When a reset signal is applied, a reset noise signal of the G pixel is output to the column signal line 27. The sampling circuit 54 performs signal processing including sample-and-hold processing on the reset noise signal and outputs a signal (referred to as "signal N") corresponding to the reset noise of the C signal.

This operation of reading reset noises of the G pixels is an operation without an electronic shutter operation. Where an electronic shutter operation is performed, electronic shuttering causes a row selection signal and a reset signal to be applied to a unit pixel row from which signal charges of the C pixels are to be output. As a result, signals corresponding to reset noises of the unit pixel row as a subject of reading are output.

Then, the next unit pixel row is selected as a subject of reading, and G signals are read-out from the S pixels of this unit pixel row. As described above, these G signals (referred to as "signals G N") contain reset noise signals of the immediately preceding frame. The above-described operation is thereafter performed repeatedly.

In the photoelectric conversion layer stack type color solid-state imaging device according to this embodiment, signals that have been read-out from the G pixels and stored in a read frame memory are processed by a signal processing section which is provided outside the device. More specifically, reset noise signals (above-mentioned signals N) of the immediately preceding frame are subtracted from image signals (above-mentioned signals G+N) containing reset noises of the G pixels of the immediately preceding frame. In this manner, random noises which cannot be lowered in the first or second embodiment can be lowered, which makes it possible to increase the S/N ratio of a dark object image and to thereby produce a good color image.

In this embodiment, noise of a G signal is lowered by adding the switch circuit 63 to each sampling circuit 54 of the second embodiment. Alternatively, noise reduction can be attained by adding switch circuits 63 to the output signal processing section 24 of the first embodiment.

Embodiment 4

Figure 7:
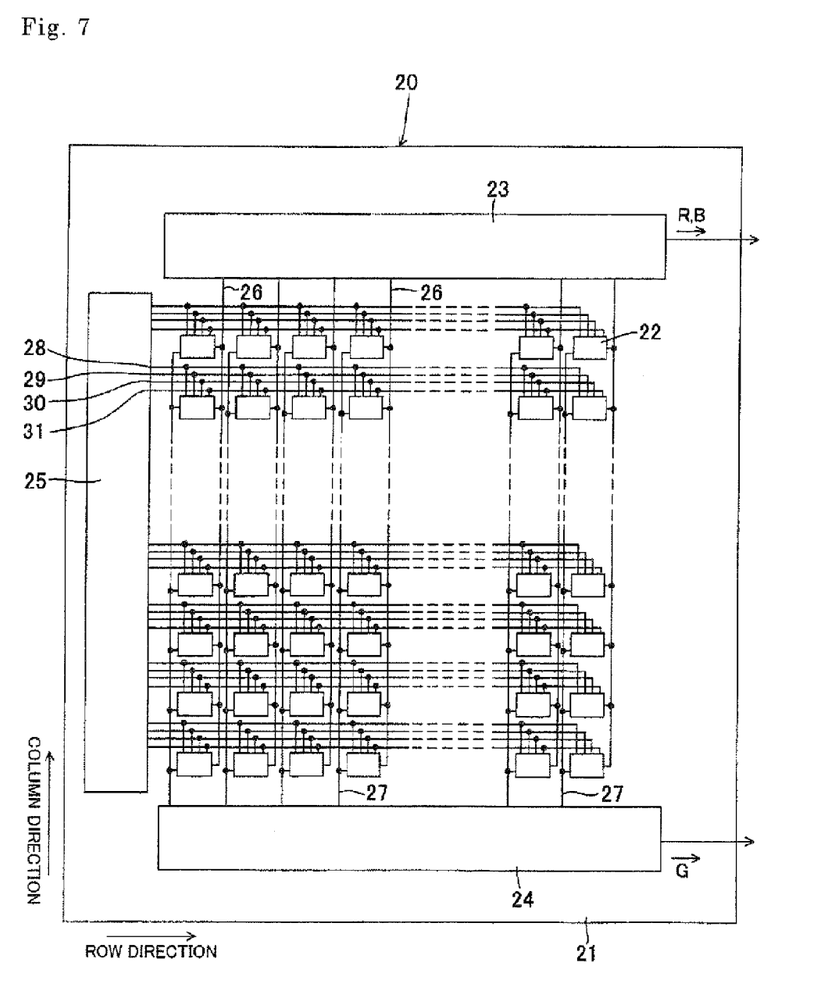
FIG. 7 schematically shows the surface of a photoelectric conversion layer stack type solid-state imaging device according to a fourth embodiment of the invention.
Figure 8:
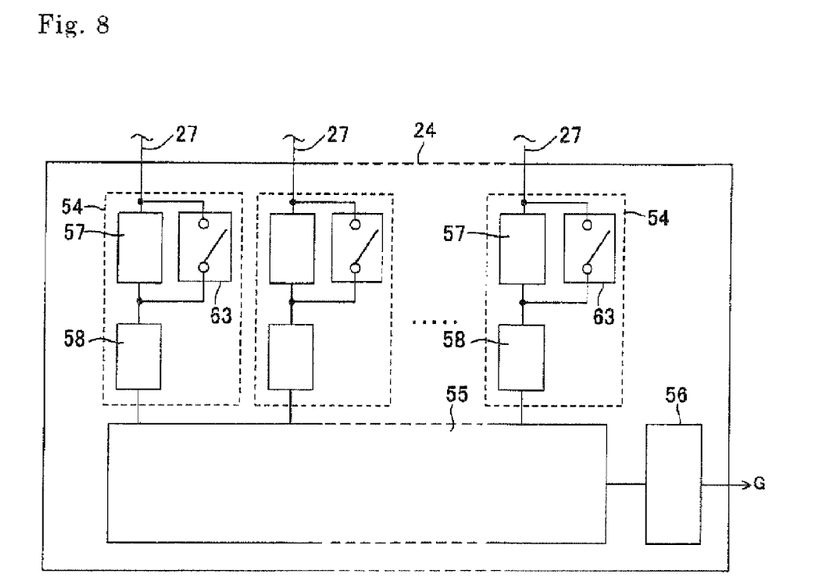
FIG. 8 shows a detailed configuration of an output signal processing section for G pixels shown in FIG. 7.

FIG. 7 schematically shows the surface of a photoelectric conversion layer stack type color solid-state imaging device according to a fourth embodiment of the invention. FIG. 8 shows the configuration of an important part of a G-signal output signal processing section of this embodiment. The sectional structure of each unit pixel etc. are the same as in the first embodiment (see FIG. 2) and hence will not be described As shown in FIG. 7, the photoelectric conversion layer stack type color solid-state imaging device according to this embodiment is configured in such a manner that the combining section 32 shown in FIG. 1 is omitted. An R signal and a B signal are directly output from the output signal processing section 23 to outside the devices and a G signal is directly output from the output signal processing section 24 to outside the device. Furthermore, as shown in FIG. 8, the switch circuit 63 that was described above in the third embodiment is provided in each sampling circuit 54 of the S-signal output processing section 24. The switch circuit 63 is always closed. Alternatively, each sampling circuit 54 may be formed by only the sample-and-hold circuit 58.

In this embodiment, the operation of reading color image signals is performed basically in the same manner as in the third embodiment. However, in this embodiment, since the G-signal output processing section 24 and the R/B-signal output signal processing section 23 are separate from each other, G signals and G-pixel reset noise signals can be read-out parallel with reading of R signals and B signals. Therefore, color image signals can be read-out two times faster than in the third embodiment.

Embodiment 5

Figure 9A:
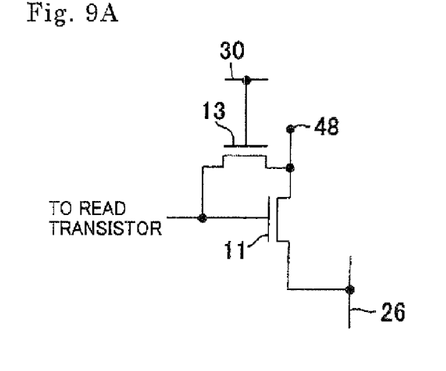
FIG. 9A is a circuit diagram of each of signal reading circuits for pixels formed in a semiconductor substrate of a photoelectric conversion layer stack type solid-state imaging device according to a fifth embodiment of the invention.

FIG. 9A is a circuit diagram of a signal reading circuit used in a photoelectric conversion layer stack type color solid-state imaging device according to a fifth embodiment of the invention. The device structure is the same as in the above-described embodiments. This signal reading circuit is used as each of signal reading circuits for reading color image signals corresponding to signal charges that are detected by the pixels formed on the semiconductor substrate side (i.e., R pixels and B pixels).

The signal reading circuit of FIG. 9A is configured in such a manner that the row selection transistor 12 is removed from the signal reading circuit of FIG. 12B or the 4-transistor signal reading circuit 51 of FIG. 2 and the output transistor 11 is directly connected to the column signal line 26. Furthermore, instead of the selection control by the row selection transistor 12, the column-direction scanning control section 25 controls the potential of the terminal 48 which is connected to the drain of the output transistor 11.

The signal reading circuit of this embodiment is rendered non-operational in the following manner. When the potential of the terminal 48 is set at a ground voltage or a low voltage and a reset signal is applied to the reset transistor 13, the output transistor 11 is turned off. Even if the potential of the terminal 48 is returned to a high voltage for a normal operation in the above setting, the non-operational state of the signal reading circuit is maintained.

This signal reading circuit is made operational in the following manner. The potential of the terminal 48 is set at the high voltage for a normal operation and a reset signal is applied to the reset transistor 13. As a result, the output transistor 11 is turned on and the signal reading circuit is made operational.

As described above, the number of transistors of each signal reading circuit of this embodiment is smaller by one than the signal reading circuit having the 4-transistor structure. Therefore, the circuit area of each signal reading circuit which is provided near the associated R pixel and B pixel can be reduced. As a result, the photodetecting areas of each R pixel and each B pixel can be increased, which means increase in sensitivity and saturation output voltage.

Embodiment 6

Figure 9B:
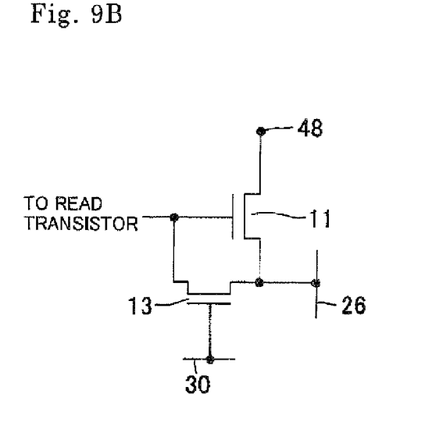
FIG. 9B is a circuit diagram of each of signal reading circuits for pixels formed in a semiconductor substrate of a photoelectric conversion layer stack type solid-state imaging device according to a sixth embodiment of the invention.

FIG. 9B is a circuit diagram of a signal reading circuit used in a photoelectric conversion layer stack type color solid-state imaging device according to a sixth embodiment of the invention. Whereas in each signal reading circuit of the fifth embodiment the reset transistor 13 is provided between the gate and the drain of the output transistor 11, in this embodiment the reset transistor 13 is provided between the gate and the source of the output transistor 11. A DC voltage is applied to the terminal 48 which is connected to the drain of the output transistor 11.

The signal reading circuit of this embodiment is rendered non-operational in the following manner. When the potential of the column signal line 26 is set at a ground voltage or a low voltage and a reset signal is applied to the reset transistor 13, the output transistor 11 is turned off. Even it a color signal of another unit pixel row comes to be applied to the column signal line 26 in the above setting, the non-operational state of the signal reading circuit is maintained.

This signal reading circuit is made operational in the following manner. The voltage applied to the terminal 48 or a high voltage that is close to it is applied to the column signal line 26 and a reset signal is applied to the reset transistor 13. As a result, the output transistor 11 is turned on and the signal reading circuit is made operational. This embodiment provides the same advantage as the fifth embodiment.

Embodiment 7

Figure 10:
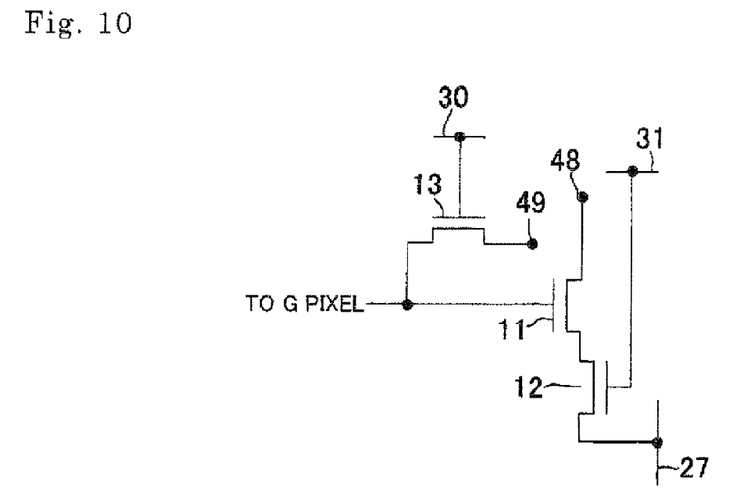
FIG. 10 is a circuit diagram of each of signal reading circuits for reading signals corresponding to hole signal charges that are detected by pixels that are formed in a photoelectric conversion layer of a photoelectric conversion layer stack type solid-state imaging device according to a seventh embodiment of the invention.

FIG. 10 is a circuit diagram of a signal reading circuit used in a photoelectric conversion layer stack type color solid-state imaging device according to a seventh embodiment of the invention. The device structure is the same as in the above-described embodiments. The photoelectric conversion layer stack type color solid-state imaging device according to this embodiment is configured in such a manner that charges of the holes of electron-hole pairs generated in the pixels (G pixels) formed in the photoelectric conversion layer 43 are used as signal charges and signals corresponding to the amounts of holes are read-out by the signal reading circuits of the embodiment.

The signal reading circuit of FIG. 10 is basically the same in configuration as the 3-transistor signal reading circuit 50 of FIG. 2, and is different from the latter in that a terminal 49 that is connected the drain of the reset transistor 13 is separated from the terminal 48 which is connected to the drain of the output transistor 11.

In the thus-configured signal reading circuit, a color signal corresponding to the amount of hole signal charge of the G pixel is supplied to the column signal line 27 in the following manner. A high voltage for a normal operation is applied to the terminal 48 and a medium voltage is applied to the terminal 49. When a reset signal is applied to the reset transistor 13, a medium voltage is applied to the gate of the output transistor 11. Therefore, even if positive signal charge (of holes) of the G pixel flows into the gate of the output transistor 11 and the gate voltage is thereby increased, the source follower circuit of the output transistor 11 operates normally.

Although the above embodiments are directed to the case that the output signals are analog signals, they naturally be digital signals. In the latter case, a configuration is possible in which an ADC (analog/digital converter) is provided in the output section of the output signal processing section(s) and an analog signal is converted into a digital signal collectively. Another possible configuration is such that ADCs are provided downstream of the respective correlation double sampling circuits and analog signals are converted into digital signals on a column-by-column basis.

The above embodiments do not refer to the use of microlenses. However, microlenses may be provided to increase the light collection efficiency of the B pixels and the R pixels which are formed in the semiconductor substrate. The microlenses are provided over the insulating film 45 as top lenses or provided inside the insulating film 41 as inner lenses. The sensitivities of the R pixels and the B pixels can thus be increased further.

In the above embodiments, the R pixels and B pixels which should be provided on the semiconductor substrate side are arranged in the depth direction of the semiconductor substrate. Alternatively, the concepts of the above embodiments can be applied to a photoelectric conversion layer stack type color solid-state imaging device in which a photoelectric conversion layer in which G pixels are formed is laid on a semiconductor substrate in which R pixels and B pixels are arranged in plane in checkered form. In this case, the R pixels and the B pixels may be photodiodes on which color filters are laid.

Although the above-described embodiments are such that the R pixels and the B pixels are formed by photodiodes and the C pixels are formed in the photoelectric conversion layer, this is just an example. The concepts of the above embodiments can be applied to general photoelectric conversion layer stack type color solid-state imaging devices in which light of one of the three primary colors is detected by pixels formed in a photoelectric conversion layer and light of the other two colors is detected by photodiodes.

As described above, according to the embodiments of the invention, low-noise color signals can be read-out from the R pixels and the B pixels which are provided on the semiconductor substrate side because R and B signals are read-out by the signal reading circuits having the 4-transistor structure. As for the G pixels which are formed in the photoelectric conversion layer, non-read-out charges (residual charges) which may cause a G-color afterimage can be reduced because G signals are read-out by the signal reading circuits having the 3-transistor structure. Good color images can thus be taken.

According to the embodiments of the invention, the number of transistors is reduced by communizing the signal reading circuits of each set of a R pixel and a B pixel. The photodetecting areas of the R pixels and the B pixels are increased accordingly, whereby the sensitivity and the saturation output voltage are increased.

As a result, it becomes possible to manufacture imaging devices having smaller pixel sizes and to realize imaging devices that are higher in resolution. Furthermore, decreasing the number of analog circuit units in the output signal processing section by one (three to two) per unit pixel column makes it possible to further reduce the chip size of the imaging device and to thereby attain further cost reduction of the imaging device.

In the third and fourth embodiments of the invention, for an output signal of each C pixel from which random noise cannot be removed in principle by a correlation double sampling circuit, a reset noise signal and an image signal containing reset noise of the immediately preceding frame are output separately. Therefore, random noise of each G-pixel signal can be reduced to a large extent by subtracting a reset noise signal of the immediately preceding frame from an image signal by using a frame memory or the like outside the imaging device. This makes it possible to take even better color images.

Facilitating manufacture and capable of taking color images having high image quality, the photoelectric conversion layer stack type solid-state imaging device according to the invention is useful when used in place of conventional CCD solid-state imaging devices, CMOS solid-state imaging devices, etc.

This application is based on Japanese Patent application JP 2006-157149, filed Jun. 6, 2006, the entire content of which is hereby incorporated by reference, the same as if fully set forth herein Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A solid-state imaging device comprising a semiconductor substrate and plural unit pixels arranged like a two-dimensional array, in which each of the unit pixels consists of a first-color pixel, a second-color pixel, and a third-color pixel for detecting incident light quantities of a first color, a second color, and a third color of three primary colors, respectively, the first-color pixels are provided in a photoelectric conversion layer which is provided above the semiconductor substrate, the second-color pixels and the third-color pixels are formed by respective photodiodes which are provided under the first-color pixel in the semiconductor substrate, and detection signals of the first-color pixels, the second-color pixels, and the third-color pixels are read-out by sets of signal reading circuits which are provided in the semiconductor substrate for the respective unit pixels, wherein:

transistors included in each of the signal reading circuits for reading the detection signals of the first-color pixels are only three transistors which are a reset transistor, a row selection transistor, and an output transistor; and each of the signal reading circuits for reading the detection signals of the second-color pixels and the third-color pixels comprise four transistors which are a read transistor, a shared reset transistor, a shared row selection transistor, and a shared output transistor.

2. The solid-state imaging device according to claim 1, wherein among the transistors constituting each of the signal reading circuits for reading the detection signals of the second-color pixels, three transistors other than the read transistor also serve as three transistors other than the read transistor among the transistors constituting the associated one of the signal reading circuits for reading the detection signals of the third-color pixels, and the two read transistors are turned on/off with different timings.

3. The solid-state imaging device according to claim 2, wherein a first signal processing section for performing signal processing on output signals of the signal reading circuits for reading the detection signals of the first-color pixels and for outputting a resulting output signal and a second signal processing section for performing signal processing on output signals of the signal reading circuits for reading the detection signals of the second-color pixels and the third-color pixels and for outputting resulting output signals are provided in the semiconductor substrate.

4. The solid-state imaging device according to claim 3, wherein a combining section for combining the output signal of the first signal processing section with the output signals of the second signal processing section and for outputting a composed signal to outside the imaging device is provided in the semiconductor substrate.

5. The solid-state imaging device according to claim 2, wherein a signal processing section for switching between output signals of signal reading circuits for reading detection signals of first-color pixels and output signals of signal reading circuits for reading detection signals of second or third pixels, performing signal processing on the output signals that are taken in by the switching, and outputting resulting output signals is provided in the semiconductor substrate.

6. The solid-state imaging device according to claim 2, wherein sample-and-hold circuits are provided at an input stage of the signal processing circuit which takes in the output signals of the signal reading circuits for reading the detection signals of the first-color pixels, and correlation double sampling circuits are provided at an input stage of the signal processing section which takes in the output signals of the signal reading circuits for reading the detection signals of the second-color pixels and the third-color pixels.

7. The solid-state imaging device according to claim 6, wherein each of the sample-and-hold circuits is composed of a correlation double sampling circuit consisting of a clamp circuit for clamping an input signal and a sample-and-hold circuit for sampling and holding an output signal of the clamp circuit, and a bypass circuit for the clamp circuit.

8. The solid-state imaging device according to claim 6, wherein after the detection signals of the first-color pixels are read-out by the signal reading circuits and taken in by the signal processing circuit, reset noise signals are read-out by the signal reading circuits and taken in by the signal processing circuit before next detection signals of the first-color pixels are read-out.

9. The solid-state imaging device according to claim 1, wherein the photoelectric conversion layer is a single-layer or multilayer organic semiconductor layer sandwiched between the transparent pixel electrode layer and the transparent counter electrode layer.

10. The solid-state imaging device according to claim 1, wherein the set of photodiodes of the second-color pixels and the set of photodiodes of the third-color pixels are separated from each other in a depth direction of the semiconductor substrate.

11. The solid-state imaging device according to claim 1, wherein the first-color pixels, the second-color pixels, and the third-color pixels detect incident light quantities as amounts of electrons.

12. The solid-state imaging device according to claim 1, wherein the first-color pixels detect incident light quantities as amounts of holes, and the second-color pixels and the third-color pixels detect incident light quantities as amounts of electrons.

13. The solid-state imaging device according to claim 3, wherein the output signals of the signal processing sections are analog signals.

14. The solid-state imaging device according to claim 3, wherein the output signals of the signal processing sections are digital signals.

15. The solid-state imaging device according to claim 1, wherein the first color, the second color, and the third color are green, blue, and red, respectively.

* * * * *